US011591464B2

(12) United States Patent
Lewis et al.

(10) Patent No.: US 11,591,464 B2
(45) Date of Patent: Feb. 28, 2023

(54) CURABLE FILM-FORMING COMPOSITIONS CONTAINING REACTIVE FUNCTIONAL POLYMERS AND POLYSILOXANE RESINS, MULTILAYER COMPOSITE COATINGS, AND METHODS FOR THEIR USE

(71) Applicant: PPG Industries Ohio, Inc., Cleveland, OH (US)

(72) Inventors: Jason Ryan Lewis, Monaca, PA (US); Susan Fundy Donaldson, Allison Park, PA (US); Matthew S. Luchansky, Wexford, PA (US); Shanti Swarup, Allison Park, PA (US); John W. Burgman, Wexford, PA (US); Justin Jones, Cranberry Township, PA (US); Bin Cao, Pittsburgh, PA (US); Hongying Zhou, Allison Park, PA (US); Danielle Kirby, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 269 days.

(21) Appl. No.: 16/631,015

(22) PCT Filed: Jul. 12, 2018

(86) PCT No.: PCT/US2018/041755
§ 371 (c)(1),
(2) Date: Jan. 14, 2020

(87) PCT Pub. No.: WO2019/014414
PCT Pub. Date: Jan. 17, 2019

(65) Prior Publication Data
US 2020/0140680 A1   May 7, 2020

Related U.S. Application Data

(60) Provisional application No. 62/532,560, filed on Jul. 14, 2017.

(51) Int. Cl.
| | |
|---|---|
| *C08L 67/02* | (2006.01) |
| *C08J 3/24* | (2006.01) |
| *C08L 33/08* | (2006.01) |
| *C09D 133/08* | (2006.01) |
| *C09D 167/02* | (2006.01) |

(52) U.S. Cl.
CPC ............... *C08L 67/02* (2013.01); *C08J 3/24* (2013.01); *C08L 33/08* (2013.01); *C09D 133/08* (2013.01); *C09D 167/02* (2013.01); *C08J 2333/08* (2013.01); *C08J 2367/02* (2013.01); *C08J 2433/08* (2013.01); *C08J 2467/02* (2013.01); *C08J 2483/04* (2013.01); *C08L 2205/025* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 4,286,048 A | 8/1981 | Merrill et al. | |
| 4,291,135 A | 9/1981 | Hohlein et al. | |
| 4,522,958 A | 6/1985 | Das et al. | |
| 4,546,046 A | 10/1985 | Etzell et al. | |
| 4,589,999 A | 5/1986 | Vasta | |
| 4,960,828 A | 10/1990 | Higuchi | |
| 5,212,273 A | 5/1993 | Das et al. | |
| 5,468,801 A | 11/1995 | Antonelli et al. | |
| 5,792,810 A | 8/1998 | Menovcik et al. | |
| 5,849,835 A | 12/1998 | Das et al. | |
| 5,965,670 A | 10/1999 | Mauer et al. | |
| 5,977,256 A | 11/1999 | Huybrechts | |
| 5,980,993 A | 11/1999 | Mauer et al. | |
| 6,111,001 A | 8/2000 | Barancyk et al. | |
| 6,136,443 A | 10/2000 | Mauer et al. | |
| 6,225,434 B1 | 5/2001 | Sadvary et al. | |
| 6,685,985 B2 | 2/2004 | Boisseau et al. | |
| 6,787,597 B1 | 9/2004 | Martin et al. | |
| 6,803,413 B2 | 10/2004 | Martin et al. | |
| 10,370,555 B2 | 8/2019 | Lewis et al. | |
| 2003/0176568 A1* | 9/2003 | Onoda | C09D 175/14 524/589 |
| 2004/0186242 A1 | 9/2004 | Bartlett et al. | |
| 2004/0225057 A1 | 11/2004 | Anderson et al. | |
| 2006/0289828 A1 | 12/2006 | Brinkhuis et al. | |
| 2007/0160851 A1 | 7/2007 | Barancyk et al. | |
| 2009/0234071 A1 | 9/2009 | Martz et al. | |
| 2010/0055467 A1 | 3/2010 | Kulfan et al. | |

(Continued)

FOREIGN PATENT DOCUMENTS

| | | |
|---|---|---|
| CN | 104830182 A | 8/2015 |
| EP | 0198519 | 1/1990 |

(Continued)

OTHER PUBLICATIONS

English translation of the abstract of SU1420962A1.

*Primary Examiner* — Robert T Butcher
(74) *Attorney, Agent, or Firm* — Krisanne Shideler

(57) ABSTRACT

A curable film-forming composition is provided, comprising: (a) a polymeric binder comprising reactive functional groups; (b) a curing agent comprising functional groups that are reactive with the reactive functional groups of (a); and (c) a polysiloxane resin comprising aromatic functional groups and terminal active hydrogen groups. In certain examples of the present invention, the polymeric binder (a) comprises an acrylic polyol prepared from a monomer mixture comprising a hydroxyl functional monomer, and the curable film-forming composition further comprises a rheology modifier comprising: (1) a non-aqueous dispersion of an internally crosslinked organic polymer; (2) a silica dispersion; and/or (3) a reaction product of an amine and an isocyanate. Also provided are coated substrates that include the curable film-forming compositions described above and methods for forming a composite coating on a substrate.

17 Claims, No Drawings

(56) References Cited

U.S. PATENT DOCUMENTS

| | | |
|---|---|---|
| 2011/0052822 A1 | 3/2011 | Chiga et al. |
| 2011/0311830 A1 | 12/2011 | Wade |
| 2012/0107584 A1* | 5/2012 | Eibon ................ C09B 67/0033 |
| | | 428/212 |
| 2013/0234070 A1 | 9/2013 | Mowrer |
| 2015/0020371 A1 | 1/2015 | Beagen, Jr. |
| 2015/0105511 A1 | 4/2015 | Huang et al. |
| 2015/0203716 A1 | 7/2015 | Moravek et al. |
| 2018/0105718 A1 | 4/2018 | Swarup et al. |

FOREIGN PATENT DOCUMENTS

| | | |
|---|---|---|
| JP | 2001259523 A2 | 9/2001 |
| RU | 1420962 A1 | 10/1993 |
| WO | WO-0109261 A1 | 2/2001 |
| WO | 2014032844 A1 | 3/2014 |
| WO | 2014063025 A1 | 4/2014 |
| WO | 2015132366 A1 | 9/2015 |

* cited by examiner

CURABLE FILM-FORMING COMPOSITIONS CONTAINING REACTIVE FUNCTIONAL POLYMERS AND POLYSILOXANE RESINS, MULTILAYER COMPOSITE COATINGS, AND METHODS FOR THEIR USE

CROSS-REFERENCE TO RELATED APPLICATION

This application claims priority to provisional U.S. Patent Application Ser. No. 62/532,560, filed Jul. 14, 2017, and entitled "CURABLE FILM-FORMING COMPOSITIONS CONTAINING REACTIVE FUNCTIONAL POLYMERS AND POLYSILOXANE RESINS AND MULTILAYER COMPOSITE COATINGS", which is incorporated herein by reference in its entirety.

FIELD OF THE INVENTION

The present invention relates to curable film-forming compositions that comprise reactive functional polymers and polysiloxane resins. The present invention also relates to multi-layer composite coatings comprising the curable film-forming compositions and methods for forming a composite coating on a substrate.

BACKGROUND OF THE INVENTION

Color-plus-clear coating systems involving the application of a colored or pigmented basecoat to a substrate followed by the application of a transparent or clear topcoat to the basecoat are standard in the industry as original finishes for automobiles. The color-plus-clear systems have outstanding gloss and distinctness of image, and the clear topcoat is particularly important for these properties.

Often during application of the coatings to an automotive substrate, which is typically done by spraying, the appearance of a coating (such as its smoothness) is different when applied to a horizontally oriented substrate surface than when applied to a vertically oriented surface. This can result in noticeably different surface appearances in different areas of the same vehicle. Uniformity of vehicle appearance can be impacted by efforts to balance workability of the formulated coatings and appearance, and developing tools that improve coating flow and leveling behavior without hurting sag resistance. In addition to the focus on horizontal/vertical uniformity, an optimal balance of sag resistance and appearance is also advantageous for good appearance in difficult shapes and contours that are prone to sags and drips during coating application.

It would be desirable to provide a curable film-forming composition that demonstrates improved appearance properties over an entire substrate surface without loss of cured film properties such as acid etch resistance and UV durability.

SUMMARY OF THE INVENTION

The present invention provides a curable film-forming, or coating, composition comprising:
  (a) a polymeric binder comprising reactive functional groups;
  (b) a curing agent comprising functional groups that are reactive with the reactive functional groups of (a); and
  (c) a polysiloxane resin comprising aromatic functional groups and terminal active hydrogen groups.

Also provided is a curable film-forming composition comprising:
  (a) an acrylic polyol prepared from a monomer mixture comprising a hydroxyl functional monomer;
  (b) a curing agent comprising functional groups that are reactive with hydroxyl functional groups;
  (c) the polysiloxane resin described above; and
  (d) a rheology modifier comprising:
    (1) a non-aqueous dispersion of an internally crosslinked organic polymer; and/or
    (2) a silica dispersion; and/or
    (3) a reaction product of an amine and an isocyanate.

Also provided is a multi-component composite coating comprising a first film-forming composition applied to a substrate to form a colored base coat, and a second, transparent film-forming composition applied on top of the base coat to form a clear top coat (clearcoat), wherein the transparent film-forming composition comprises a curable film-forming composition described above.

Additionally provided is a method for forming a composite coating on a substrate comprising:
  (A) applying a first film-forming composition to at least a portion of a surface of the substrate to form a colored base coat; and
  (B) applying a second, transparent film-forming composition to at least a portion of the base coat formed in step (A) prior to substantially curing the first film-forming composition, to form a clear top coat thereon, wherein the transparent film-forming composition comprises either of the curable film-forming compositions described above.

DETAILED DESCRIPTION

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$")), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Plural referents as used herein encompass singular and vice versa. For example, while the invention has been described in terms of "an" acrylic resin having epoxy functional groups, a plurality, including a mixture of such resins can be used.

Any numeric references to amounts, unless otherwise specified, are "by weight". The term "equivalent weight" is a calculated value based on the relative amounts of the various ingredients used in making the specified material and is based on the solids of the specified material. The relative amounts are those that result in the theoretical weight in grams of the material, like a polymer, produced from the ingredients and give a theoretical number of the particular functional group that is present in the resulting polymer. The theoretical polymer weight is divided by the theoretical number of equivalents of functional groups to give the equivalent weight. For example, urethane equivalent weight is based on the equivalents of urethane groups in the polyurethane material.

The curable film-forming compositions of the present invention are typically solventborne. As used herein, the terms "thermosetting" and "curable" can be used interchangeably and refer to resins that "set" irreversibly upon curing or crosslinking, wherein the polymer chains of the polymeric components are joined together by covalent bonds. This property is usually associated with a crosslinking reaction of the composition constituents often induced, for example, by heat or radiation. See Hawley, Gessner G., The Condensed Chemical Dictionary, Ninth Edition, page 856; Surface Coatings, vol. 2, Oil and Colour Chemists' Association, Australia, TAFE Educational Books (1974). Once cured or crosslinked, a thermosetting resin will not melt upon the application of heat and is insoluble in solvents.

The curable film-forming compositions of the present invention comprise (a) a polymeric binder comprising reactive functional groups. The polymeric binder is a film-forming binder and may be selected from one or more of acrylic polymers, polyesters, polyurethanes, polyamides, polyethers, polythioethers, polythioesters, polythiols, polyenes, polyols, polysilanes, polysiloxanes, fluoropolymers, polycarbonates, and epoxy resins. Generally these binders can be made by any method known to those skilled in the art where the compounds are water dispersible, emulsifiable, or of limited water solubility as understood in the art. The functional groups on the film-forming binder may be selected from at least one of carboxylic acid groups, amine groups, epoxide groups, hydroxyl groups, thiol groups, carbamate groups, amide groups, urea groups, (meth)acrylate groups, styrenic groups, vinyl groups, allyl groups, aldehyde groups, acetoacetate groups, hydrazide groups, cyclic carbonate, acrylate, maleic and mercaptan groups. The functional groups on the film-forming binder are selected so as to be reactive with those on the curing agent (b).

Suitable acrylic compounds include copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and often 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic copolymer can include hydroxyl functional groups, which are often incorporated into the polymer by including one or more hydroxyl functional monomers in the reactants used to produce the copolymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below. The acrylic polymer can also be prepared with N-(alkoxymethyl) acrylam ides and N-(alkoxymethyl)methacrylam ides. In particular examples of the present invention, the hydroxyl functional monomer comprises a hydroxyalkyl group with an alkyl chain of at least four carbon atoms, such that the hydroxyl (—OH) group is remote from the acrylic polymer backbone after polymerization, separated by at least four carbon atoms (excluding any carbonyl carbon atoms, as in an acrylic monomer). For example, in a monomer mixture that includes hydroxybutyl methacrylate, the hydroxyl (—OH) group is remote from the acrylic polymer backbone after polymerization, separated by four carbon atoms in the butyl group.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. (Note: these epoxy functional monomers may also be used to prepare epoxy functional acrylic polymers.) Examples of carboxylic acids include saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, often containing from 8 to 30 carbon atoms, such as butyl glycidyl ether, octyl glycidyl ether, phenyl glycidyl ether and para-(tertiary butyl) phenyl glycidyl ether. Particular glycidyl esters include those of the structure:

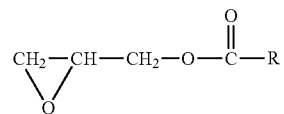

where R is a hydrocarbon radical containing from about 4 to about 26 carbon atoms. Typically, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which are commercially available from Shell Chemical Co.

Carbamate functional groups can be included in the acrylic polymer by copolymerizing the acrylic monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. In this reaction, a low molecular weight carbamate functional material derived from an alcohol or glycol ether is reacted with the hydroxyl groups of the acrylic polyol, yielding a carbamate functional acrylic polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used. Other carbamate functional monomers as known to those skilled in the art may also be used.

Amide functionality may be introduced to the acrylic polymer by using suitably functional monomers in the preparation of the polymer, or by converting other functional groups to amido-groups using techniques known to those skilled in the art. Likewise, other functional groups may be incorporated as desired using suitably functional monomers if available or conversion reactions as necessary.

Acrylic polymers can be prepared via aqueous emulsion polymerization techniques and used directly in the preparation of aqueous coating compositions, or can be prepared via organic solution polymerization techniques for solventborne compositions. When prepared via organic solution polymerization with groups capable of salt formation such as acid or amine groups, upon neutralization of these groups with a base or acid the polymers can be dispersed into aqueous medium. Generally any method of producing such polymers that is known to those skilled in the art utilizing art recognized amounts of monomers can be used.

Besides acrylic polymers, the polymeric binder (a) in the curable film-forming composition may be an alkyd resin or a polyester. Such polymers may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. Where it is desired to produce air-drying alkyd resins, suitable drying oil fatty acids may be used and include, for example, those derived from linseed oil, soya bean oil, tall oil, dehydrated castor oil, or tung oil.

Likewise, polyamides may be prepared utilizing polyacids and polyamines. Suitable polyacids include those listed above and polyamines may be selected from at least one of ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl4,4'-diamino-dicyclohexyl methanes (such as 3,3'-dimethyl-4,4'-diamino-dicyclohexyl methane and 3,3'-diethyl-4, 4'-diamino-dicyclohexyl methane), 2,4- and/or 2,6-diaminotoluene and 2,4'- and/or 4,4'-diaminodiphenyl methane. Note that the phrase "and/or" when used in a list is meant to encompass alternative embodiments including each individual component in the list as well as any combination of components. For example, the list "A, B, and/or C" is meant to encompass seven separate embodiments that include A, or B, or C, or A+B, or A+C, or B+C, or A+B+C.

Carbamate functional groups may be incorporated into the polyester or polyamide by first forming a hydroxyalkyl carbamate which can be reacted with the polyacids and polyols/polyamines used in forming the polyester or polyamide. The hydroxyalkyl carbamate is condensed with acid functionality on the polymer, yielding terminal carbamate functionality. Carbamate functional groups may also be incorporated into the polyester by reacting terminal hydroxyl groups on the polyester with a low molecular weight carbamate functional material via a transcarbamoylation process similar to the one described above in connection with the incorporation of carbamate groups into the acrylic polymers, or by reacting isocyanic acid with a hydroxyl functional polyester.

Other functional groups such as amine, amide, thiol, urea, or others listed above may be incorporated into the polyamide, polyester or alkyd resin as desired using suitably functional reactants if available, or conversion reactions as necessary to yield the desired functional groups. Such techniques are known to those skilled in the art.

Polyurethanes can also be used as the polymeric binder (a) in the curable film-forming composition. Among the polyurethanes which can be used are polymeric polyols which generally are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Diisocyanates are typically used, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate polymethylene polyphenyl isocyanate, and isocyanate trimers based on 1,6-hexamethylene diisocyanate or isophorone diisocyanate. As with the polyesters, the polyurethanes can be prepared with unreacted carboxylic acid groups, which upon neutralization with bases such as amines allows for dispersion into aqueous medium.

Terminal and/or pendent carbamate functional groups can be incorporated into the polyurethane by reacting a polyisocyanate with a polymeric polyol containing the terminal/pendent carbamate groups. Alternatively, carbamate functional groups can be incorporated into the polyurethane by reacting a polyisocyanate with a polyol and a hydroxyalkyl carbamate or isocyanic acid as separate reactants. Carbamate functional groups can also be incorporated into the polyurethane by reacting a hydroxyl functional polyurethane with a low molecular weight carbamate functional material via a transcarbamoylation process similar to the one described above in connection with the incorporation of carbamate groups into the acrylic polymer. Additionally, an isocyanate functional polyurethane can be reacted with a hydroxyalkyl carbamate to yield a carbamate functional polyurethane.

Other functional groups such as amide, thiol, urea, or others listed above may be incorporated into the polyurethane as desired using suitably functional reactants if available, or conversion reactions as necessary to yield the desired functional groups. Such techniques are known to those skilled in the art.

Examples of polyether polyols are polyalkylene ether polyols which include those having the following structural formula:

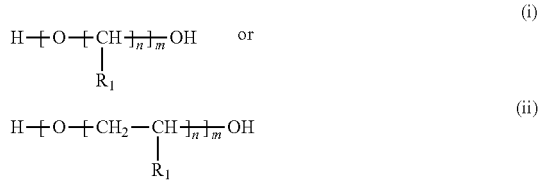

where the substituent $R_1$ is hydrogen or lower alkyl containing from 1 to 5 carbon atoms including mixed substituents, and n is typically from 2 to 6 and m is from 8 to 100 or higher. Included are poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Particular polyethers include those sold under the names TERATHANE and TERACOL, available from Invista, and POLYMEG, available from Lyondell Chemical Co.

Pendant carbamate functional groups may be incorporated into the polyethers by a transcarbamoylation reaction. Other functional groups such as acid, amine, epoxide, amide, thiol, and urea may be incorporated into the polyether as desired using suitably functional reactants if available, or conversion reactions as necessary to yield the desired functional groups. Examples of suitable amine functional polyethers include those sold under the name JEFFAMINE, such as JEFFAMINE D2000, a polyether functional diamine available from Huntsman Corporation.

Suitable epoxy functional polymers for use as the resin component (a) may include a polyepoxide chain extended by reacting together a polyepoxide and a polyhydroxyl group-containing material selected from alcoholic hydroxyl group-containing materials and phenolic hydroxyl group-containing materials to chain extend or build the molecular weight of the polyepoxide.

A chain extended polyepoxide is typically prepared by reacting together the polyepoxide and polyhydroxyl group-containing material neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is usually conducted at a temperature of about 80° C. to 160° C. for about 30 to 180 minutes until an epoxy group-containing resinous reaction product is obtained.

The equivalent ratio of reactants; i. e., epoxy:polyhydroxyl group-containing material is typically from about 1.00:0.75 to 1.00:2.00.

The polyepoxide by definition has at least two 1,2-epoxy groups. In general the epoxide equivalent weight of the polyepoxide will range from 100 to about 2000, typically from about 180 to 500. The epoxy compounds may be saturated or unsaturated, cyclic or acyclic, aliphatic, alicyclic, aromatic or heterocyclic. They may contain substituents such as halogen, hydroxyl, and ether groups.

Examples of polyepoxides are those having a 1,2-epoxy equivalency greater than one and usually about two; that is, polyepoxides which have on average two epoxide groups per molecule. The most commonly used polyepoxides are polyglycidyl ethers of cyclic polyols, for example, polyglycidyl ethers of polyhydric phenols such as Bisphenol A, resorcinol, hydroquinone, benzenedimethanol, phloroglucinol, and catechol; or polyglycidyl ethers of polyhydric alcohols such as alicyclic polyols, particularly cycloaliphatic polyols such as 1,2-cyclohexane diol, 1,4-cyclohexane diol, 2,2-bis(4-hydroxycyclohexyl)propane, 1,1-bis(4-hydroxycyclohexyl)ethane, 2-methyl-1,1-bis(4-hydroxycyclohexyl)propane, 2,2-bis(4-hydroxy-3-tertiarybutylcyclohexyl)propane, 1,3-bis(hydroxymethyl)cyclohexane and 1,2-bis(hydroxymethyl)cyclohexane. Examples of aliphatic polyols include, inter alia, trimethylpentanediol and neopentyl glycol.

Polyhydroxyl group-containing materials used to chain extend or increase the molecular weight of the polyepoxide may additionally be polymeric polyols such as any of those disclosed above. The present invention may comprise epoxy resins such as diglycidyl ethers of Bisphenol A, Bisphenol F, glycerol, novolacs, and the like. Exemplary suitable polyepoxides are described in U.S. Pat. No. 4,681,811 at column 5, lines 33 to 58, the cited portion of which is incorporated by reference herein.

Epoxy functional film-forming polymers may alternatively be acrylic polymers prepared with epoxy functional monomers such as glycidyl acrylate, glycidyl methacrylate, allyl glycidyl ether, and methallyl glycidyl ether. Polyesters, polyurethanes, or polyamides prepared with glycidyl alcohols or glycidyl amines, or reacted with an epihalohydrin are also suitable epoxy functional resins. Epoxide functional groups may be incorporated into a resin by reacting hydroxyl groups on the resin with an epihalohydrin or dihalohydrin such as epichlorohydrin or dichlorohydrin in the presence of alkali.

Nonlimiting examples of suitable fluoropolymers include fluoroethylene-alkyl vinyl ether alternating copolymers (such as those described in U.S. Pat. No. 4,345,057) available from Asahi Glass Company under the name LUMIFLON; fluoroaliphatic polymeric esters commercially available from 3M of St. Paul, Minn. under the name FLUORAD; and perfluorinated hydroxyl functional (meth) acrylate resins.

Suitable curing agents (b) for use in the curable film-forming compositions of the present invention include aminoplasts, polyisocyanates, including blocked isocyanates, polyepoxides, beta-hydroxyalkylamides, polyacids, organometallic acid-functional materials, polyamines, polyamides, polysulfides, polythiols, polyenes such as polyacrylates, polyols, polysilanes and mixtures of any of the foregoing, and include those known in the art for any of these materials.

Useful aminoplasts can be obtained from the condensation reaction of formaldehyde with an amine or amide. Nonlimiting examples of amines or amides include melamine, urea and benzoguanamine.

Although condensation products obtained from the reaction of alcohols and formaldehyde with melamine, urea or benzoguanamine are most common, condensates with other amines or amides can be used. Formaldehyde is the most commonly used aldehyde, but other aldehydes such as acetaldehyde, crotonaldehyde, and benzaldehyde can also be used.

The aminoplast can contain imino and methylol groups. In certain instances, at least a portion of the methylol groups can be etherified with an alcohol to modify the cure response. Any monohydric alcohol like methanol, ethanol, n-butyl alcohol, isobutanol, and hexanol can be employed for this purpose. Nonlimiting examples of suitable aminoplast resins are commercially available from Cytec Industries, Inc. under the trademark CYMEL® and from Solutia, Inc. under the trademark RESIMENE®.

Other crosslinking agents suitable for use include polyisocyanate crosslinking agents. As used herein, the term "polyisocyanate" is intended to include blocked (or capped) polyisocyanates as well as unblocked polyisocyanates. The polyisocyanate can be aliphatic, aromatic, or a mixture thereof. Although higher polyisocyanates such as isocyanurates of diisocyanates are often used, diisocyanates can also be used. Isocyanate prepolymers, for example reaction products of polyisocyanates with polyols also can be used. Mixtures of polyisocyanate crosslinking agents can be used.

The polyisocyanate can be prepared from a variety of isocyanate-containing materials. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used.

Isocyanate groups may be capped or uncapped as desired. If the polyisocyanate is to be blocked or capped, any suitable aliphatic, cycloaliphatic, or aromatic alkyl monoalcohol or phenolic compound known to those skilled in the art can be used as a capping agent for the polyisocyanate. Examples of suitable blocking agents include those materials which would unblock at elevated temperatures such as lower aliphatic alcohols including methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Other suitable capping agents include oximes such as methyl ethyl ketoxime, acetone oxime and cyclohexanone oxime, lactams such as epsilon-caprolactam, pyrazoles such as dimethyl pyrazole, and amines such as dibutyl amine.

Polyepoxides are suitable curing agents for polymers having carboxylic acid groups and/or amine groups. Examples of suitable polyepoxides include low molecular weight polyepoxides such as 3,4-epoxycyclohexylmethyl 3,4-epoxycyclohexanecarboxylate and bis(3,4-epoxy-6-methylcyclohexyl-methyl) adipate. Higher molecular weight polyepoxides, including the polyglycidyl ethers of polyhydric phenols and alcohols described above, are also suitable as crosslinking agents.

Beta-hydroxyalkylamides are suitable curing agents for polymers having carboxylic acid groups. The beta-hydroxyalkylamides can be depicted structurally as follows:

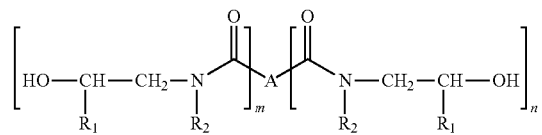

wherein $R_1$ is H or $C_1$ to $C_5$ alkyl; $R_2$ is H, $C_1$ to $C_5$ alkyl, or:

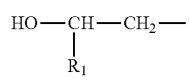

wherein $R_1$ is as described above; A is a bond or a polyvalent organic radical derived from a saturated, unsaturated, or aromatic hydrocarbon including substituted hydrocarbon radicals containing from 2 to 20 carbon atoms; m is equal to 1 or 2; n is equal to 0 or 2, and m+n is at least 2, usually within the range of from 2 up to and including 4. Most often, A is a $C_2$ to $C_{12}$ divalent alkylene radical.

Polyacids, particularly polycarboxylic acids, are suitable curing agents for polymers having epoxy functional groups. Examples of suitable polycarboxylic acids include adipic, succinic, sebacic, azelaic, and dodecanedioic acid. Other suitable polyacid crosslinking agents include acid group-containing acrylic polymers prepared from an ethylenically unsaturated monomer containing at least one carboxylic acid group and at least one ethylenically unsaturated monomer that is free from carboxylic acid groups. Such acid functional acrylic polymers can have an acid number ranging from 30 to 150. Acid functional group-containing polyesters can be used as well. Low molecular weight polyesters and half-acid esters can be used which are based on the condensation of aliphatic polyols with aliphatic and/or aromatic polycarboxylic acids or anhydrides. Examples of suitable aliphatic polyols include ethylene glycol, propylene glycol, butylene glycol, 1,6-hexanediol, trimethylol propane, di-trimethylol propane, neopentyl glycol, 1,4-cyclohexanedimethanol, pentaerythritol, and the like. The polycarboxylic acids and anhydrides may include, inter alia, terephthalic acid, isophthalic acid, phthalic acid, phthalic anhydride, tetrahydrophthalic acid, tetrahydrophthalic anhydride, hexahydrophthalic anhydride, methylhexahydrophthalic anhydride, chlorendic anhydride, and the like. Mixtures of acids and/or anhydrides may also be used. The above-described polyacid crosslinking agents are described in further detail in U.S. Pat. No. 4,681,811, at column 6, line 45 to column 9, line 54, which is incorporated herein by reference.

Nonlimiting examples of suitable polyamine crosslinking agents include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Nonlimiting examples of suitable aliphatic and alicyclic diamines include 1,2-ethylene diamine, 1,2-propylene diamine, 1,8-octane diamine, isophorone diamine, propane-2,2-cyclohexyl amine, and the like. Nonlimiting examples of suitable aromatic diamines include phenylene diamines and toluene diamines, for example o-phenylene diamine and p-tolylene diamine. Polynuclear aromatic diamines such as 4,4'-biphenyl diamine, methylene dianiline and monochloromethylene dianiline are also suitable.

Examples of suitable aliphatic diamines include, without limitation, ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane, or mixtures thereof. Cycloaliphatic diamines are available commercially from Huntsman Corporation (Houston, Tex.) under the designation of JEFFLINK™ such as JEFFLINK™ 754. Additional aliphatic cyclic polyamines may also be used, such as DESMOPHEN NH 1520 available from Bayer MaterialScience and/or CLEARLINK 1000, which is a secondary aliphatic diamine available from Dorf Ketal. POLYCLEAR 136 (available from BASF/Hansen Group LLC), the reaction product of isophorone diamine and acrylonitrile, is also suitable. Other exemplary suitable polyamines are described in U.S. Pat. No. 4,046,729 at column 6, line 61 to column 7, line 26, and in U.S. Pat. No. 3,799,854 at column 3, lines 13 to 50, the cited portions of which are incorporated by reference herein. Additional polyamines may also be used, such as ANCAMINE polyamines, available from Air Products and Chemicals, Inc.

Suitable polyamides include any of those known in the art. For example, ANCAMINE polyamides, available from Air Products and Chemicals, Inc.

Suitable polyenes may include those that are represented by the formula:

wherein A is an organic moiety, X is an olefinically unsaturated moiety and m is at least 2, typically 2 to 6. Examples of X are groups of the following structure:

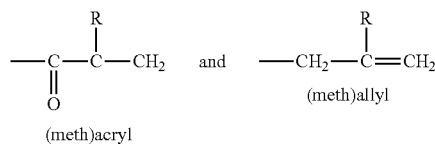

wherein each R is a radical selected from H and methyl.

The polyenes may be compounds or polymers having in the molecule olefinic double bonds that are polymerizable by exposure to radiation. Examples of such materials are (meth)acrylic-functional (meth)acrylic copolymers, epoxy resin (meth)acrylates, polyester (meth)acrylates, polyether (meth)acrylates, polyurethane (meth)acrylates, amino (meth)acrylates, silicone (meth)acrylates, and melamine (meth)acrylates. The number average molar mass (Mn) of these compounds is often around 200 to 10,000. The molecule often contains on average 2 to 20 olefinic double bonds that are polymerizable by exposure to radiation. Aliphatic and/or cycloaliphatic (meth)acrylates in each case are often used. (Cyclo)aliphatic polyurethane (meth)acrylates and (cyclo)aliphatic polyester (meth)acrylates are particularly suitable. The binders may be used singly or in mixture.

Specific examples of polyurethane (meth)acrylates are reaction products of the polyisocyanates such as 1,6-hexamethylene diisocyanate and/or isophorone diisocyanate including isocyanurate and biuret derivatives thereof with hydroxyalkyl (meth)acrylates such as hydroxyethyl (meth) acrylate and/or hydroxypropyl (meth)acrylate. The polyisocyanate can be reacted with the hydroxyalkyl (meth)acrylate in a 1:1 equivalent ratio or can be reacted with an NCO/OH equivalent ratio greater than 1 to form an NCO-containing reaction product that can then be chain extended with a polyol such as a diol or triol, for example 1,4-butane diol, 1,6-hexane diol and/or trimethylol propane. Examples of polyester (meth)acrylates are the reaction products of (meth) acrylic acid or anhydride with polyols, such as diols, triols and tetraols, including alkylated polyols, such as propoxylated diols and triols. Examples of polyols include 1,4-butane diol, 1,6-hexane diol, neopentyl glycol, trimethylol propane, pentaerythritol and propoxylated 1,6-hexane diol. Specific examples of polyester (meth)acrylate are glycerol tri(meth)acrylate, trimethylolpropane tri(meth)acrylate, pentaerythritol tri(meth)acrylate and pentaerythritol tetra(meth) acrylate.

Besides (meth)acrylates, (meth)allyl compounds or polymers can be used either alone or in combination with (meth)acrylates. Examples of (meth)allyl materials are polyallyl ethers such as the diallyl ether of 1,4-butane diol and the triallyl ether of trimethylol propane. Examples of other (meth)allyl materials are polyurethanes containing (meth) allyl groups. For example, reaction products of the polyisocyanates such as 1,6-hexamethylene diisocyanate and/or isophorone diisocyanate including isocyanurate and biuret derivatives thereof with hydroxyl-functional allyl ethers, such as the monoallyl ether of 1,4-butane diol and the diallylether of trimethylol propane. The polyisocyanate can be reacted with the hydroxyl-functional allyl ether in a 1:1 equivalent ratio or can be reacted with an NCO/OH equivalent ratio greater than 1 to form an NCO-containing reaction product that can then be chain extended with a polyol such as a diol or triol, for example 1,4-butane diol, 1,6-hexane diol and/or trimethylol propane.

As used herein the term "polythiol functional material" refers to polyfunctional materials containing two or more thiol functional groups (SH). Suitable polythiol functional materials for use in forming the curable film-forming composition are numerous and can vary widely. Such polythiol functional materials can include those that are known in the art. Non-limiting examples of suitable polythiol functional materials can include polythiols having at least two thiol groups including compounds and polymers. The polythiol can have ether linkages (—O—), sulfide linkages (—S—), including polysulfide linkages (—$S_x$—), wherein x is at least 2, such as from 2 to 4, and combinations of such linkages.

The polythiols for use as curing agents in the present invention include materials of the formula:

wherein $R^1$ is a polyvalent organic moiety and n is an integer of at least 2, typically 2 to 6.

Non-limiting examples of suitable polythiols include esters of thiol-containing acids of the formula $HS-R^2-COOH$ wherein $R^2$ is an organic moiety with polyhydroxy compounds of the structure $R^3-(OH)_n$ wherein $R^3$ is an organic moiety and n is at least 2, typically 2 to 6. These components can be reacted under suitable conditions to give polythiols having the general structure:

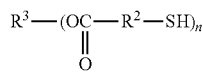

wherein $R^2$, $R^3$ and n are as defined above.

Examples of thiol-containing acids are thioglycolic acid ($HS-CH_2COOH$), α-mercaptopropionic acid ($HS-CH(CH_3)-COOH$) and β-mercaptopropionic acid ($HS-CH_2CH_2COOH$) with polyhydroxy compounds such as glycols, triols, tetraols, pentaols, hexaols, and mixtures thereof. Other non-limiting examples of suitable polythiols include ethylene glycol bis (thioglycolate), ethylene glycol bis(β-mercaptopropionate), trimethylolpropane tris (thioglycolate), trimethylolpropane tris (β-mercaptopropionate), pentaerythritol tetrakis (thioglycolate) and pentaerythritol tetrakis (β-mercaptopropionate), and mixtures thereof.

Suitable polyacids and polyols useful as curing agents include any of those known in the art, such as those described herein for the making of polyesters.

Appropriate mixtures of crosslinking agents may also be used in the invention. The amount of the crosslinking agent in the curable film-forming composition generally ranges from 5 to 75 percent by weight based on the total weight of resin solids in the curable film-forming composition. For example, the minimum amount of crosslinking agent may be at least 5 percent by weight, often at least 10 percent by weight and more often, at least 15 percent by weight. The maximum amount of crosslinking agent may be 75 percent by weight, more often 60 percent by weight, or 50 percent by weight. Ranges of crosslinking agent may include, for example, 5 to 50 percent by weight, 5 to 60 percent by weight, 10 to 50 percent by weight, 10 to 60 percent by weight, 10 to 75 percent by weight, 15 to 50 percent by weight, 15 to 60 percent by weight, and 15 to 75 percent by weight.

The curable film-forming compositions of the present invention additionally comprise (c) a polysiloxane resin comprising aromatic functional groups, such as pendant phenyl groups, and terminal active hydrogen groups. The polysiloxane resin may be prepared from commercially available polysiloxane resins; for example, amine functional polysiloxane resins. Examples include Dow Corning 3055 (also known as DOWSIL 3055), available from Dow Corning Corporation, and SiVance C1008, available from Milliken Chemical. Alternatively, the polysiloxane resin may be prepared from methoxy functional polysiloxane resins. An example of such a resin is Dow Corning 3074, available from Dow Corning Corporation. These polysiloxane resins may be used as is; alternatively, the terminal amine or methoxy groups may be chain extended to yield different terminal functional groups. Typically, the terminal active hydrogen groups on the polysiloxane resin (c) comprise hydroxyl, thiol, and/or carboxylic acid groups. For example, an amine group on the polysiloxane may be reacted with a cyclic carbonate such as ethylene or propylene carbonate to yield a urethane linkage and a terminal hydroxyl group. Alternatively, amine groups may be reacted with a lactone to yield an amide linkage and a terminal hydroxyl group. An anhydride such as methylhexahydrophthalic anhydride may be reacted with the terminal amine groups to yield an amide linkage and a terminal carboxylic acid group. If the polysiloxane resin originally has methoxy functional groups, a methoxy group on the polysiloxane may be reacted with a polyol to yield a Si—O—C ether linkage and a terminal hydroxyl group. Methoxy groups may also be reacted with hydroxyl functional carboxylic acid to form a Si—O—C ether linkage and a terminal carboxylic group. The carboxylic group may be chain extended with a polyol derived from an epoxy to yield terminal hydroxyl groups.

Usually the polysiloxane resin (c) is present in the curable film-forming composition in an amount of at least 0.5 percent by weight, based on the total weight of resin solids in the curable film-forming composition, such as at least 1 percent by weight. Also, the polysiloxane resin (c) may be present in the curable film-forming composition in an amount of at most 20 percent by weight, or at most 10 percent by weight, particularly when it is used as a film-forming binder. In examples of the present invention when the polysiloxane resin is present in additive amounts, it is typically present in an amount of at most 5 percent by weight or at most 3 percent by weight.

The present invention is also drawn to curable film-forming compositions comprising:
  (a) an acrylic polyol prepared from a monomer mixture comprising a hydroxyl functional monomer;
  (b) a curing agent comprising functional groups that are reactive with hydroxyl functional groups;
  (c) the polysiloxane resin described above; and
  (d) a rheology modifier comprising:
    (1) a non-aqueous dispersion of an internally crosslinked organic polymer; and/or
    (2) a silica dispersion; and/or
    (3) a reaction product of an amine and an isocyanate.

In this scenario, the curable film-forming compositions of the present invention comprise (a) an acrylic polyol. The acrylic polyol comprises an addition polymer and may be prepared from a monomer mixture comprising a hydroxyl functional monomer. The hydroxyl functional monomer may comprise any of those disclosed above. In particular examples of the present invention, the hydroxyl functional monomer comprises a hydroxyalkyl group with an alkyl chain of at least four carbon atoms, such that the hydroxyl (—OH) group is remote from the acrylic polymer backbone after polymerization, separated by at least four carbon atoms (excluding any carbonyl carbon atoms, as in an acrylic monomer). For example, in a monomer mixture that includes hydroxybutyl methacrylate, the hydroxyl (—OH) group is remote from the acrylic polymer backbone after polymerization, separated by four carbon atoms in the butyl group. As used herein, the term "polymer" is meant to refer to polymers, prepolymers, and oligomers; the prefix "poly" refers to two or more.

Suitable acrylic polyols include copolymers of one or more alkyl esters of acrylic acid or methacrylic acid, optionally together with one or more other polymerizable ethylenically unsaturated monomers such as any of those disclosed above.

The acrylic polyol may also comprise terminal and/or pendant carbamate groups.

In certain examples of the present invention, at least a portion of the acrylic polyol (a), which may or may not also comprise carbamate functional groups as described above, is further reacted with a lactide prior to incorporation into the curable film-forming composition. In this reaction, hydroxyl functional groups on the acrylic polyol react with the lactide by a ring-opening reaction, yielding a branch with multiple ester linkages and a terminal hydroxyl functional group. This lactide reaction may be performed before or after incorporation of the acrylic polyol into the curable film-forming composition, but it is typically performed prior to incorporation into the curable film-forming composition. In general, a lactide is the cyclic diester, i.e., the di-lactone of two molecules of any 2-hydroxycarboxylic acid, but the term "lactide" usually specifically refers to the cyclic di-ester of lactic acid (2-hydroxypropionic acid). An example of another suitable lactide is the cyclic di-ester of glycolic acid (2-hydroxyacetic acid). Up to 100% of the hydroxyl groups on the acrylic polyol (a) may be reacted with a lactide. The acrylic polyol (a) may comprise a mixture of lactide-modified and non-modified acrylic polyol; i. e., a mixture of the acrylic polyol (a) that has not been reacted with a lactide and acrylic polyol (a) that has been at least partially reacted with a lactide.

The acrylic polyol (a) demonstrates a weight average molecular weight of at least 3000, such as at least 5000, or at least 5500, and at most 10,000, or at most 7000, or at most 6500. Weight average and number average molecular weights as reported herein may be determined by gel permeation chromatography (GPC) using a polystyrene standard.

Surface waviness is an indication of the roughness of a surface, and may be measured using a wave scan instrument such as the BYK Wavescan Plus available from BYK Gardner USA, which measures surface topography via an optical profile. The wave scan instrument uses a point source (i.e. laser) to illuminate the surface over a predetermined distance, for example 10 centimeters, at an angle of incidence of 60°. The reflected light is 30 measured at the same, but opposite angle. As the light beam hits a "peak" or "valley" of the surface, a maximum signal is detected; when the beam hits a "slope" of a peak/valley a minimum signal is registered. The measured signal frequency is equal to double spatial frequency of the coating surface topography. The surface "waviness" is differentiated into "long-wavelength/LW (1.2-12 mm)" and "short-wavelength/SW (0.3-1.2 mm)" to simulate visual evaluation by the human eye. Data are divided into longwave and shortwave signals using a mathematical filter function. Each range in value from 0 to 50. Long-wavelength waviness represents the variance of the longwave signal amplitude, while the short-wavelength waviness represents variance of the shortwave signal amplitude. The long- and short-wavelength waviness of a coating surface can give an indirect measure of topography-influencing factors such as substrate roughness, and flow and leveling properties of coatings. Longwave values may be determined using a BYK Wavescan Plus instrument in accordance with the manufacturer's suggested method of operation. Longwave values of lesser magnitude are indicative of coatings that are smoother in appearance.

The amount of the acrylic polyol (a) in the curable film-forming composition generally ranges from 10 to 95 percent by weight based on the total weight of resin solids in the curable film-forming composition. For example, the minimum amount of polymeric binder may be at least 25 percent by weight, often at least 30 percent by weight and more often, at least 40 percent by weight. The maximum amount of polymeric binder may be 95 percent by weight, more often 85 percent by weight, or 75 percent by weight. Ranges of polymeric binder may include, for example, 25 to 90 percent by weight, 25 to 80 percent by weight, 30 to 70 percent by weight, 30 to 60 percent by weight, and 30 to 50 percent by weight.

As used herein, the phrase "based on the total weight of resin solids" or "based on the total weight of organic binder solids" (used interchangeably) of the composition means that the amount of the component added during the formation of the composition is based upon the total weight of the resin solids (non-volatiles) of the film forming materials, including cross-linkers and polymers present during the formation of the composition, but not including any water, solvent, or any additive solids such as hindered amine stabilizers, photoinitiators, pigments including extender pigments and fillers, flow modifiers, catalysts, and UV light absorbers.

The curable film-forming compositions of the present invention further comprise (b) a curing (crosslinking) agent containing functional groups that are reactive with the hydroxyl functional groups of (a). Such curing agents typically comprise one or more aminoplasts, polyisocyanates, including blocked isocyanates, polyacids, and mixtures of any of the foregoing, and include any of those described above, present in the amounts specified above.

The curable film-forming compositions of the present invention further comprises (c) the polysiloxane resin described above, comprising aromatic functional groups and terminal active hydrogen groups, present in the amounts indicated above; and (d) a rheology modifier comprising one or more of the following components:

(1) a non-aqueous dispersion of an internally crosslinked organic polymer;
(2) a silica dispersion; and/or
(3) a reaction product of an amine and an isocyanate.

The internally crosslinked organic polymer in the non-aqueous dispersion (1) is typically an acrylic polymer and may be prepared from a monomer mixture comprising at least one monomer having functional groups that allow for crosslinking with itself and potentially with adjacent polymers, allowing for the formation of a gel, such as a microgel. Particle size may be determined from among the numerous techniques known in the art, such as the method described below. The particle size is measured with a Malvern Zetasizer, which is a high performance two angle particle size analyzer for the enhanced detection of aggregates and measurement of small or dilute samples, and samples at very low or high concentration using dynamic light scattering. Typical applications of dynamic light scattering are the characterization of particles, emulsions or molecules, which have been dispersed or dissolved in a liquid. The Brownian motion of particles or molecules in suspension causes laser light to be scattered at different intensities. Analysis of these intensity fluctuations yields the velocity of the Brownian motion and hence the particle size using the Stokes-Einstein relationship. The reported particle sizes for all examples are the Z average mean value.

For example, any monomer known in the art which contains at least two ethylenically unsaturated double bonds may be included in the monomer mixture. Suitable monomers include, without limitation, di(meth)acrylates (e.g., hexanediol di(meth)acrylate), ethylene glycol di(meth)acrylate, butanediol di(meth)acrylate, decandediol di(meth)acrylate, or a combination of di(meth)acrylates. An exemplary internally crosslinked organic polymer may be prepared as described in the Examples below, from a monomer mixture comprising:

(i) methyl methacrylate;
(ii) butyl acrylate;
(iii) styrene; and
(iv) ethylene glycol dimethacrylate.

The internally crosslinked organic polymer may be dispersed in an organic continuous phase comprising an organic solvent or polymer using high stress mixing or homogenization to form the non-aqueous dispersion (1). Suitable non-aqueous media for use as the organic continuous phase include ketones such as methyl amyl ketone, and glycol ethers such as 2-butoxyethanol.

The use of the non-aqueous dispersion of the internally crosslinked organic polymer improves the "hold-out" between coating layers when the curable film-forming composition of the present invention is used in a multicomponent composite coating. As used herein, the term hold-out refers to preventing or minimizing significant mixing between a first applied uncured coating composition and the subsequently applied uncured coating composition(s), i.e., the layers remain largely separate and distinct. Thus, the present invention allows for maintenance of separate and distinct layers in a wet-on-wet, or wet-on-wet-on-wet, application. A coating system that does not have good hold-out between the layers may have poor appearance, such as "mud-cracking", which is evidenced by small cracks or fissures on the surface of the coating, or by consistency of shortwave appearance over a range of processing conditions.

The rheology modifier (d) may additionally or alternatively include (2) a silica dispersion. Any of those known in the art as suitable rheology control agents may be used.

The rheology modifier (d) may additionally or alternatively include (3) a reaction product of an amine and an isocyanate, usually in the form of a bisurea. The bisurea may be crystalline. Suitable isocyanates include polyisocyanates. The polyisocyanate can be aliphatic, aromatic, or a mixture thereof. Although higher polyisocyanates such as isocyanurates of diisocyanates are often used, diisocyanates are more often used. Isocyanate prepolymers, for example reaction products of polyisocyanates with polyols also can be used. Mixtures of polyisocyanates can be used.

The polyisocyanate can be prepared from a variety of isocyanate-containing materials. Examples of suitable polyisocyanates include the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. Trimers prepared from one or more of these diisocyanates may also be used.

Suitable amines used to prepare the reaction product (3) may be primary or secondary monoamines or mixtures thereof. The amines may be aromatic or aliphatic (e.g., cycloaliphatic). Non-limiting examples of suitable monoamines can include aliphatic polyamines such as ethylamine, isomeric propylamines, butylamines, pentylamines, hexylamines, cyclohexylamine, and benzylamine. In a particular example of the present invention, the reaction product (3) comprises hexamethylene diisocyanate at least partially capped with benzylamine.

The reaction product (3) may be added to the curable film-forming composition neat, or may be dispersed in a carrier vehicle such as an acrylic polyol prepared from a monomer mixture comprising:

(i) 35 to 40 percent by weight of a beta-hydroxy ester functional monomer such as any of those described above, prepared from an ethylenically unsaturated acid functional monomer and an epoxy compound containing at least 5 carbon atoms;
(ii) 15 to 20 percent by weight of hydroxyethyl methacrylate;
(iii) 25 to 30 percent by weight of styrene; and
(iv) 10 to 15 percent by weight of 2-ethylhexyl acrylate, wherein the amounts are based on the total weight of monomers in the monomer mixture. When the reaction product (3) is dispersed in a carrier vehicle, it is typically present in the dispersion in an amount of 2 to 5 percent by weight, based on the total weight of the dispersion. The reaction product (3) is usually present in the curable film-forming composition in an amount of 0.1 to 2.0 percent by weight, such as 0.3 to 0.7 percent by weight, often 0.65 percent by weight, based on the total weight of resin solids in the curable film-forming composition. The dispersion of the reaction product (3) in the carrier vehicle is typically present in the curable film-forming composition in an amount of 10 to 20 percent by weight, often 15 percent by weight, based on the total weight of resin solids in the curable film-forming composition.

Each of the curable film-forming compositions of the present invention may further comprise additional polymeric resins, usually carbamate functional resins such as one or more carbamate functional polyester polyols. When used, the carbamate functional resin is present in the curable film-forming composition in an amount of at least 15 percent by weight, or at least 20 percent by weight, and at most 30 percent by weight, based on the total weight of resin solids in the curable film-forming composition. An exemplary amount is 25 percent by weight.

The curable film-forming compositions of the present invention may additionally include other optional ingredients commonly used in such compositions. For example, the composition may further comprise a hindered amine light stabilizer for UV degradation resistance. Such hindered amine light stabilizers include those disclosed in U.S. Pat. No. 5,260,135. When they are used they are present in the composition in an amount of 0.1 to 2 percent by weight, based on the total weight of resin solids in the film-forming composition. Other optional additives may be included such as colorants, plasticizers, abrasion-resistant particles, film strengthening particles, fillers, catalysts such as dodecylbenzene sulfonic acid blocked with diisopropanolamine or N, N-Dimethyldodecylamine, antioxidants, biocides, defoamers, surfactants, wetting agents, dispersing aids, adhesion promoters, UV light absorbers and stabilizers, a stabilizing agent, organic cosolvents, reactive diluents, grind vehicles, and other customary auxiliaries, or combinations thereof.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discrete "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. Special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

A photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one example, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

The photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the coating composition in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the compositions.

As used herein, the terms "adhesion promoter" and "adhesion promoting component" refer to any material that, when included in the composition, enhances the adhesion of the coating composition to a metal substrate. Such an adhesion promoting component often comprises a free acid. As used herein, the term "free acid" is meant to encompass organic and/or inorganic acids that are included as a separate component of the compositions as opposed to any acids that may be used to form a polymer that may be present in the composition. The free acid may comprise tannic acid, gallic acid, phosphoric acid, phosphorous acid, citric acid, malonic acid, a derivative thereof, or a mixture thereof. Suitable derivatives include esters, amides, and/or metal complexes of such acids. Often, the free acid comprises a phosphoric acid, such as a 100 percent orthophosphoric acid, superphosphoric acid or the aqueous solutions thereof, such as a 70 to 90 percent phosphoric acid solution.

In addition to or in lieu of such free acids, other suitable adhesion promoting components are metal phosphates, organophosphates, and organophosphonates. Suitable organophosphates and organophosphonates include those disclosed in U.S. Pat. No. 6,440,580 at column 3, line 24 to column 6, line 22, U.S. Pat. No. 5,294,265 at column 1, line 53 to column 2, line 55, and U.S. Pat. No. 5,306,526 at column 2, line 15 to column 3, line 8, the cited portions of which are incorporated herein by reference. Suitable metal phosphates include, for example, zinc phosphate, iron phosphate, manganese phosphate, calcium phosphate, magnesium phosphate, cobalt phosphate, zinc-iron phosphate, zinc-manganese phosphate, zinc-calcium phosphate, including the materials described in U.S. Pat. Nos. 4,941,930, 5,238,506, and 5,653,790. As noted above, in certain situations, phosphates are excluded.

The adhesion promoting component may comprise a phosphatized epoxy resin. Such resins may comprise the reaction product of one or more epoxy-functional materials and one or more phosphorus-containing materials. Non-limiting examples of such materials, which are suitable for use in the present invention, are disclosed in U.S. Pat. No. 6,159,549 at column 3, lines 19 to 62, the cited portion of which is incorporated by reference herein.

The curable film-forming compositions of the present invention may also comprise alkoxysilane adhesion promoting agents, for example, acryloxyalkoxysilanes, such as γ-acryloxypropyltrimethoxysilane and methacrylatoalkoxysilane, such as γ-methacryloxypropyltrimethoxysilane, as well as epoxy-functional silanes, such as γ-glycidoxypropyltrimethoxysilane. Exemplary suitable alkoxysilanes are described in U.S. Pat. No. 6,774,168 at column 2, lines 23 to 65, the cited portion of which is incorporated by reference herein. Siloxane borates, such as those described in the examples below, are also suitable.

The adhesion promoting component is usually present in the coating composition in an amount ranging from 0.05 to 20 percent by weight, such as at least 0.05 percent by weight or at least 0.25 percent by weight, and at most 20 percent by weight or at most 15 percent by weight, with ranges such as 0.05 to 15 percent by weight, 0.25 to 15 percent by weight, or 0.25 to 20 percent by weight, with the percentages by weight being based on the total weight of resin solids in the composition.

The curable film-forming compositions of the present invention may be formulated to a resin solids content of at least 52 percent by weight, such as at least 57 percent by weight, based on the total weight of resin solids in the curable film-forming composition. An exemplary composition has a solids content of 57 to 59 percent, as measured using a Mettler-Toledo HX204 Moisture Analyzer at 140° C.

The curable film-forming compositions of the present invention may be applied to a substrate surface and cured to form a coating layer as described below. Upon curing of the curable film-forming composition to form a cured composition, the cured composition demonstrates a crosslink density of up to 20 mmol/cc, as measured using dynamic mechanical analysis.

Substrates to which compositions of the present invention may be applied include rigid metal substrates such as ferrous metals, aluminum, aluminum alloys, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. The substrate may alternatively comprise a polymer or a composite material such as a fiberglass composite. Car parts typically formed from thermoplastic and thermoset materials include bumpers and trim.

Steel substrates (such as cold rolled steel or any of the steel substrates listed above) coated with a weldable, zinc-rich or iron phosphide-rich organic coating are also suitable for use in the present invention. Such weldable coating compositions are disclosed in U.S. Pat. Nos. 4,157,924 and 4,186,036. Cold rolled steel is also suitable when pretreated with an appropriate solution known in the art, such as a metal phosphate solution, an aqueous solution containing at least one Group IIIB or IVB metal, an organophosphate solution, an organophosphonate solution, and combinations thereof, as discussed below. Examples of aluminum alloys include those alloys used in the automotive or aerospace industry, such as 2000, 6000, or 7000 series aluminums; 2024, 7075, 6061 are particular examples. Alloys may be unclad or they may contain a clad layer on one or more surfaces, the clad layer consisting of a different aluminum alloy than the base/bulk alloy beneath the clad layer.

The substrate may alternatively comprise more than one metal or metal alloy in that the substrate may be a combination of two or more metal substrates assembled together such as hot-dipped galvanized steel assembled with aluminum substrates. The substrate may comprise part of a vehicle. "Vehicle" is used herein in its broadest sense and includes all types of vehicles, such as but not limited to airplanes, helicopters, cars, trucks, buses, vans, golf carts, motorcycles, bicycles, railroad cars, tanks and the like. It will be appreciated that the portion of the vehicle that is coated according to the present invention may vary depending on why the coating is being used.

The shape of the metal substrate can be in the form of a sheet, plate, bar, rod or any shape desired, but it is usually in the form of an automobile part, such as a body, door, fender, hood or bumper. The thickness of the substrate can vary as desired.

The curable film-forming composition may be applied directly to the metal substrate when there is no intermediate coating between the substrate and the curable film-forming composition. By this is meant that the substrate may be bare, as described below, or may be treated with one or more pretreatment compositions as described below, but the substrate is not coated with any coating compositions such as an electrodepositable composition or a primer composition prior to application of the curable film-forming composition of the present invention.

As noted above, the substrates to be used may be bare metal substrates. By "bare" is meant a virgin metal substrate that has not been treated with any pretreatment compositions such as conventional phosphating baths, heavy metal rinses, etc. Additionally, bare metal substrates being used in the present invention may be a cut edge of a substrate that is otherwise treated and/or coated over the rest of its surface. Alternatively, the substrates may undergo one or more treatment steps known in the art prior to the application of the curable film-forming composition.

The substrate may optionally be cleaned using conventional cleaning procedures and materials. These would include mild or strong alkaline cleaners such as are commercially available and conventionally used in metal pretreatment processes. Examples of alkaline cleaners include Chemkleen 163 and Chemkleen 177, both of which are available from PPG Industries, Pretreatment and Specialty Products. Such cleaners are generally followed and/or preceded by a water rinse. The metal surface may also be rinsed with an aqueous acidic solution after or in place of cleaning with the alkaline cleaner. Examples of rinse solutions include mild or strong acidic cleaners such as the dilute nitric acid solutions commercially available and conventionally used in metal pretreatment processes.

According to the present invention, at least a portion of a cleaned aluminum substrate surface may be deoxidized, mechanically or chemically. As used herein, the term "deoxidize" means removal of the oxide layer found on the surface of the substrate in order to promote uniform deposition of the pretreatment composition (described below), as well as to promote the adhesion of the pretreatment composition coating to the substrate surface. Suitable deoxidizers will be familiar to those skilled in the art. A typical mechanical deoxidizer may be uniform roughening of the substrate surface, such as by using a scouring or cleaning pad. Typical chemical deoxidizers include, for example, acid-based deoxidizers such as phosphoric acid, nitric acid, fluoroboric acid, sulfuric acid, chromic acid, hydrofluoric acid, and ammonium bifluoride, or Amchem 7/17 deoxidizers (available from Henkel Technologies, Madison Heights, Mich.), OAKITE DEOXIDIZER LNC (commercially available from Chemetall), TURCO DEOXIDIZER 6 (commercially available from Henkel), or combinations thereof. Often, the chemical deoxidizer comprises a carrier, often an aqueous medium, so that the deoxidizer may be in the form of a solution or dispersion in the carrier, in which case the solution or dispersion may be brought into contact with the substrate by any of a variety of known techniques, such as dipping or immersion, spraying, intermittent spraying, dipping followed by spraying, spraying followed by dipping, brushing, or roll-coating.

A metal substrate may optionally be pretreated with any suitable solution known in the art, such as a metal phosphate solution, an aqueous solution containing at least one Group IIIB or IVB metal, an organophosphate solution, an organophosphonate solution, and combinations thereof. The pretreatment solutions may be essentially free of environmentally detrimental heavy metals such as chromium and nickel. Suitable phosphate conversion coating compositions may be any of those known in the art that are free of heavy metals. Examples include zinc phosphate, which is used most often, iron phosphate, manganese phosphate, calcium phosphate, magnesium phosphate, cobalt phosphate, zinc-iron phosphate, zinc-manganese phosphate, zinc-calcium phosphate, and layers of other types, which may contain one or more multivalent cations. Phosphating compositions are known to those skilled in the art and are described in U.S. Pat. Nos. 4,941,930, 5,238,506, and 5,653,790.

The IIIB or IVB transition metals and rare earth metals referred to herein are those elements included in such groups in the CAS Periodic Table of the Elements as is shown, for example, in the *Handbook of Chemistry and Physics*, 63rd Edition (1983).

Typical group IIIB and IVB transition metal compounds and rare earth metal compounds are compounds of zirconium, titanium, hafnium, yttrium and cerium and mixtures thereof. Typical zirconium compounds may be selected from hexafluorozirconic acid, alkali metal and ammonium salts thereof, ammonium zirconium carbonate, zirconyl nitrate, zirconium carboxylates and zirconium hydroxy carboxylates such as hydrofluorozirconic acid, zirconium acetate, zirconium oxalate, ammonium zirconium glycolate, ammonium zirconium lactate, ammonium zirconium citrate, and mixtures thereof. Hexafluorozirconic acid is used most often. An example of a titanium compound is fluorotitanic acid and its salts. An example of a hafnium compound is hafnium nitrate. An example of a yttrium compound is yttrium nitrate. An example of a cerium compound is cerous nitrate.

Typical compositions to be used in the pretreatment step include non-conductive organophosphate and organophosphonate pretreatment compositions such as those disclosed in U.S. Pat. Nos. 5,294,265 and 5,306,526. Such organophosphate or organophosphonate pretreatments are available commercially from PPG Industries, Inc. under the name NUPAL®.

In the aerospace industry, anodized surface treatments as well as chromium based conversion coatings/pretreatments are often used on aluminum alloy substrates. Examples of anodized surface treatments would be chromic acid anodizing, phosphoric acid anodizing, boric acid-sulfuric acid anodizing, tartaric acid anodizing, sulfuric acid anodizing. Chromium based conversion coatings would include hexavalent chromium types, such as Bonderite® M-CR1200 from Henkel, and trivalent chromium types, such as Bonderite® M-CR T5900 from Henkel.

The curable film-forming composition of the present invention may be applied to the substrate using conventional techniques including dipping or immersion, spraying, intermittent spraying, dipping followed by spraying, spraying followed by dipping, brushing, or roll-coating.

The coating compositions of the present invention may be used alone as a protective layer or may serve as a unicoat, or monocoat, layer. Alternatively, the compositions of the present invention may be in combination as primers, basecoats, and/or topcoats. Thus the present invention provides a coated substrate comprising a substrate and a film-forming composition applied to a surface of the substrate, forming a coating; wherein the film-forming composition comprises any of the curable film-forming compositions described above. The present invention also provides a multi-component composite coating comprising a first film-forming composition applied to a substrate to form a colored base coat, and a second, transparent film-forming composition applied on top of the base coat to form a clear top coat, wherein the transparent film-forming composition comprises the curable film-forming composition of the present invention as described above. The term "transparent", as used for example in connection with a substrate, film, material and/or coating, means that the indicated substrate, coating, film and/or material is optically clear and has the property of transmitting light without appreciable scattering so that objects lying beyond are entirely visible.

Suitable base coats include any of those known in the art, and may be waterborne, solventborne or powdered. The base coat typically includes a film-forming resin, crosslinking material and pigment. Non-limiting examples of suitable base coat compositions include waterborne base coats such as are disclosed in U.S. Pat. Nos. 4,403,003; 4,147,679; and 5,071,904.

After application of each composition to the substrate, a film is formed on the surface of the substrate by driving solvent, i.e., organic solvent and/or water, out of the film by heating or by an air-drying period. Suitable drying conditions will depend on the particular composition and/or application, but in some instances a drying time of from about 1 to 5 minutes at a temperature of about 70 to 250° F. (27 to 121° C.) will be sufficient. More than one coating layer of the present composition may be applied if desired. Usually between coats, the previously applied coat is flashed; that is, exposed to ambient conditions for the desired amount of time. Ambient temperature typically ranges from 60 to 90° F. (15.6 to 32.2° C.), such as a typical room temperature, 72° F. (22.2° C.).

The thickness of the coating is usually from 0.1 to 3 mils (2.5 to 75 microns), such as 0.2 to 2.0 mils (5.0 to 50 microns). The coating composition may then be heated. In the curing operation, solvents are driven off and crosslinkable components of the composition are crosslinked. The heating and curing operation is sometimes carried out at a temperature in the range of from 70 to 250° F. (27 to 121° C.) but, if needed, lower or higher temperatures may be used. As noted previously, the coatings of the present invention may also cure without the addition of heat or a drying step. Additionally, the first coating composition may be applied and then the second applied thereto "wet-on-wet", or at least one base coat may be applied on top of a primer before the primer is cured, followed by application of a clear coat to the base coat(s) before the base coat(s) is cured; i. e., "wet-on-wet-on-wet" or "3-wet", and the entire multi-layer coating stack cured simultaneously in a compact process (also known as 3C1B). Alternatively, each coating composition can be cured before application of the next coating composition.

The present invention further provides a method for forming a composite coating on a substrate comprising:

(A) applying a first film-forming composition to at least a portion of a surface of the substrate to form a colored base coat; and (B) applying a second, transparent film-forming composition to at least a portion of the base coat formed in step (A) prior to substantially curing the first film-forming composition, to form a clear top coat thereon, wherein the transparent film-forming composition comprises any of the curable film-forming compositions described above.

In the method of the present invention, a liquid or powder primer may be applied to the substrate to form a primer coating upon the surface of the substrate prior to applying the first film-forming composition of step (A), and then the first film-forming composition may be applied directly onto the primer coating. Again, the primer coating may be cured prior to application of the first film-forming composition in step (A), or at least one base coat may be applied on top of a primer before the primer is cured, followed by application of a clear coat to the base coat(s) before the base coat(s) is cured in a "wet-on-wet-on-wet" process, and then the entire multi-layer coating stack may be cured simultaneously in a compact process. The method of the present invention may further comprise (C) holding the coated substrate at a temperature and for a time sufficient to substantially cure the composite coating after all coating compositions have been applied to the substrate. Application and curing methods and conditions may be as described above.

After application of a curable film-forming composition of the present invention to a substrate and after curing to form a cured coating, the cured coating formed from the curable film-forming composition typically demonstrates a Longwave value at least 20 percent lower than a similar cured coating formed from a composition that does not contain the polysiloxane resin described above. This is evident when the compositions are applied to both horizontal and vertically oriented substrate surfaces.

Each of the characteristics and examples described above, and combinations thereof, may be said to be encompassed by the present invention. The present invention is thus drawn to the following nonlimiting aspects:

1. A curable film-forming composition comprising:
    (a) a polymeric binder comprising reactive functional groups;
    (b) a curing agent comprising functional groups that are reactive with the reactive functional groups of (a); and
    (c) a polysiloxane resin comprising aromatic functional groups and terminal active hydrogen groups.

2. The curable film-forming composition according to aspect 1 comprising:
    (a) an acrylic polyol prepared from a monomer mixture comprising a hydroxyl functional monomer;
    (b) a curing agent comprising functional groups that are reactive with hydroxyl functional groups;
    (c) a polysiloxane resin comprising aromatic functional groups and terminal active hydrogen groups; and
    (d) a rheology modifier comprising:
        (1) a non-aqueous dispersion of an internally crosslinked organic polymer;
        (2) a silica dispersion; and/or
        (3) a reaction product of an amine and an isocyanate;

3. The curable film-forming composition according to aspect 1, wherein the polymeric binder (a) comprises a binder selected from an epoxide functional polymer, an acrylic polyol, a polyester polyol and combinations thereof.

4. The curable film-forming composition according to any of the preceding aspects, wherein the polymeric binder (a) further comprises carbamate groups.

5. The curable film-forming composition according to any of the preceding aspects, wherein the curing agent (b) comprises an aminoplast, a polyacid, and/or a polyisocyanate.

6. The curable film-forming composition according to any of the preceding aspects, wherein the terminal active hydrogen groups on the polysiloxane resin (c) comprise hydroxyl and/or carboxylic acid groups.

7. The curable film-forming composition according to any of the preceding aspects, wherein the polysiloxane resin (c) comprises urethane and/or ether linkages.

8. The curable film-forming composition according to any of the preceding aspects, wherein the polysiloxane resin (c) is present in the curable film-forming composition in an amount of at least 0.5 percent by weight, based on the total weight of resin solids in the curable film-forming composition.

9. A coated substrate comprising:
    A) a substrate; and
    B) a film-forming composition applied to a surface of the substrate, forming a coating; wherein the film-forming composition comprises the curable film-forming composition of any of aspects 1 to 8.

10. A multi-component composite coating comprising a first film-forming composition applied to a substrate to form a colored base coat, and a second, transparent film-forming composition applied on top of the base coat to form a clear top coat, wherein the transparent film-forming composition comprises any of the compositions according to any of aspects 1 to 8 above.

11. The multi-component composite coating according to aspect 10 wherein, the multi-component composite coating further comprises a primer composition applied to the substrate prior to application of the first film-forming composition.

12. A method for forming a composite coating on a substrate comprising: (A) applying a first film-forming composition to at least a portion of a surface of the substrate to form a colored base coat; and (B) applying a second, transparent film-forming composition to at least a portion of the base coat formed in step (A) prior to substantially curing the first film-forming composition, to form a clear top coat thereon, wherein the transparent film-forming composition comprises any of the compositions according to any of aspects 1 to 8 above.

13. The method according to aspect 12, wherein the method further comprises a step of forming a primer coating upon the surface of the substrate prior to applying the first film-forming composition of step (A), wherein the first coating composition is applied directly onto the primer coating.

14. The method according to aspect 13, wherein the primer coating is cured prior to applying the first coating composition of step (A).

15. The methods according to any of aspects 12 to 14, wherein the method further comprises (C) holding the substrate at a temperature and for a time sufficient to substantially cure the composite coating after all coating compositions have been applied to the substrate.

Illustrating the invention are the following examples that are not to be considered as limiting the invention to their details. All parts and percentages in the examples, as well as throughout the specification, are by weight unless otherwise indicated.

Example A

A polysiloxane resin comprising aromatic functional groups and terminal active hydrogen groups was prepared as follows:

| Ingredients | Parts by weight |
|---|---|
| Charge #1 | |
| SiVance C1008[1] | 350.3 |
| Charge #2 | |
| Propylene Carbonate[2] | 59.1 |

[1]SiVance C1008 is an amine functional silicone resin available from Milliken Chemical
[2]Propylene Carbonate is available from BASF Charge #1 was added into a 1-liter, 4-necked flask equipped with a motor-driven steel stir blade, a thermocouple, a nitrogen blanket, and a water-cooled condenser. Next, Charge #2 was added, and the mixture was allowed to exotherm. When the exotherm subsided, the reaction was heated to 60° C. by a mantle controlled by the thermocouple via a temperature feedback control device. The reaction mixture was held at temperature for 3 hours and then heated to 80° C. and held until the sample measured ~0.1 milliequivalents (meq) of amine per gram of sample as determined by titration with 0.1N HCl. The solids were measured (110° C. for 1 hour) and determined to be 95.7%. The molecular weight was determined to be approximately 1569 (Mw) by a low molecular weight GPC method relative to polystyrene standard of 162-30,000 Da.

Example B

A polysiloxane resin comprising aromatic functional groups and terminal active hydrogen groups was prepared as follows:

| Charge | Ingredients | Parts by weight |
|---|---|---|
| #1 | Cyclohexane 1,4-dimethanol (CHDM)[1] | 72.1 |
| | 2,2,4-Trimethyl-1,3-pentanediol (TMPD)[2] | 146.2 |
| | Tyzor TPT[3] | 0.5 |
| #2 | Dow Corning 3074[4] | 727.9 |

[1]Cyclohexane 1,4-dimethanol is commercially available from Eastman Chemical Company
[2]2,2,4-Trimethyl-1,3-pentanediol is commercially available from Eastman Chemical Company
[3]Tyzor TPT is Tetraisopropyl Titanate and commercially available from DORF KETAL CHEMICALS
[4]Dow Corning 3074 intermediate is commercially available from DOW CHEMICAL CO.

Charge 1 and 2 were added to a round bottom flask equipped with a stirrer, condenser, temperature control system, and distillation to collect methanol. The reaction mixture was slowly heated to 105° C. to collect methanol. After distillation was slowed down, the reaction mixture was heated to 125° C. to continue collecting the methanol. The reaction mixture was held at 125° C. until no methanol came off. The reaction mixture was cooled to 40° C. and was poured out. The solids content was 97% and Mw was around 9893, as determined by Gel Permeation Chromatography using a Waters 2695 separation module with a Waters 410 differential refractometer (RI detector) and polystyrene standards. The Mw values reported according to the invention were determined using this method. Tetrahydrofuran (THF) was used as the eluent at a flow rate of 1 ml min-1, and two PL Gel Mixed C columns were used for separation.

Examples 1-8

Eight (8) clearcoat compositions were prepared from the following mixture of ingredients. Examples 1-4 are comparative in that they do not contain any polysiloxane resin. Examples 5-8 are illustrative of the present invention. Each composition was reduced with methyl N-amyl ketone as needed to a spray viscosity of 28 seconds, measured at 23° C. with a #4 Ford efflux cup:

| Components | Parts by weight of Component | | | | | | | |
|---|---|---|---|---|---|---|---|---|
| | Ex. 1 | Ex. 2 | Ex. 3 | Ex. 4 | Ex. 5 | Ex. 6 | Ex. 7 | Ex. 8 |
| Methyl N-amyl ketone | 102.0 | 102.0 | 102.0 | 102.0 | 102.0 | 102.0 | 102.0 | 102.0 |
| Ethyl 3-ethoxypropanoate | 24.0 | 24.0 | 24.0 | 24.0 | 24.0 | 24.0 | 24.0 | 24.0 |
| CHIGUARD 328[1] | 17.76 | 17.76 | 17.76 | 17.76 | 17.76 | 17.76 | 17.76 | 17.76 |
| RESIMENE 757[2] | 183.7 | 183.7 | 183.7 | 183.7 | 183.7 | 183.7 | 183.7 | 183.7 |
| Acrylic polyol A[3] | 35.2 | 35.2 | 35.2 | 35.2 | 35.2 | 35.2 | 35.2 | 35.2 |
| SCA[4] | 91.4 | 91.4 | 91.4 | 91.4 | 91.4 | 91.4 | 91.4 | 91.4 |
| Acrylic polyol B[5] | 238.1 | 285.7 | 333.3 | 381.0 | 209.5 | 257.1 | 304.8 | 352.4 |
| Polyester polyol[6] | 309.1 | 263.6 | 218.2 | 172.7 | 309.1 | 263.6 | 218.2 | 172.7 |
| Polysiloxane Resin of Example A | 0.0 | 0.0 | 0.0 | 0.0 | 18.2 | 18.2 | 18.2 | 18.2 |
| DISPARLON OX-60[7] | 2.2 | 2.2 | 2.2 | 2.2 | 2.2 | 2.2 | 2.2 | 2.2 |
| EVERSORB 93[8] | 1.8 | 1.8 | 1.8 | 1.8 | 1.8 | 1.8 | 1.8 | 1.8 |
| Siloxane borate A[9] | 13.8 | 13.8 | 13.8 | 13.8 | 13.8 | 13.8 | 13.8 | 13.8 |

-continued

| Components | Parts by weight of Component | | | | | | | |
|---|---|---|---|---|---|---|---|---|
| | Ex. 1 | Ex. 2 | Ex. 3 | Ex. 4 | Ex. 5 | Ex. 6 | Ex. 7 | Ex. 8 |
| Dodecylbenzylsulfonic acid solution Reduction | 21.8 | 21.8 | 21.8 | 21.8 | 21.8 | 21.8 | 21.8 | 21.8 |
| Methyl N-amyl ketone | | | | | | | | |

[1]UV absorber commercially available from Chitec Technology.
[2]Melamine curing agent commercially available from INEOS Melamines.
[3]Acrylic Polyol A: Example A from U.S. patent application Ser. No. 15/596,127
[4]SCA (Sag Control Agent): Example B from U.S. patent application Ser. No. 15/596,127
[5]Acrylic Polyol B: Example C from U.S. patent application Ser. No. 15/596,127
[6]Polyester Polyol: Example 3 in U.S. Pat. No. 6,228,953
[7]Additive available from Kusumoto Chemicals.
[8]Hindered amine light stabilizer available from Everlight Chemical Taiwan.
[9]Siloxane Borate A: Example E from U.S. patent application Ser. No. 15/59612

Coatings were applied to steel panels that were coated with PPG Electrocoat (ED 6280Z) commercially available from PPG. Substrate panels were obtained from ACT Test Panels, LLC of Hillsdale, Mich. A solventborne primer commercially available from PPG Industries, Inc. as LP6534R was spray applied in an environment controlled to 70-75° F. (21-24° C.) and 60-70% relative humidity. The primer was applied in one coat and then flashed at ambient temperature for 6 minutes. The film thickness was approximately 0.8 mils (20 microns). A solventborne basecoat commercially available from PPG as DC7235RL was spray applied over the primed panels in two coats with a 1.5 minute flash between coats, and then flashed at ambient temperature for 7 minutes. The film thickness was approximately 0.6 mils (16 microns). Each clearcoat was spray applied over the basecoated panels in two coats with a 1.5 minute flash between coats. The clearcoated panels were allowed to flash for 8 minutes at ambient conditions, then baked for 10 minutes at 178° F. (81° C.) followed by a final bake for 25 minutes at 285° F. (140° C.). The film thickness was approximately 2.0 mils (50 microns).

Appearance and physical properties were measured on the coated panels. Lower BYK Wavescan values and higher DOI values are more desirable for appearance; these properties were improved for virtually all of the examples of the present invention as shown below.

| Horizontal Panels - Appearance and Physical Properties | | | | | | | |
|---|---|---|---|---|---|---|---|
| | BYK Wavescan[10] | | | | | | |
| Example | du | Wb | Wc | Wd | DOI | Long Wave | Short Wave |
| 1 | 12.0 | 34.0 | 13.1 | 14.8 | 86.6 | 4.7 | 26.1 |
| 2 | 11.6 | 33.3 | 13.3 | 15.6 | 86.9 | 4.6 | 24.2 |
| 3 | 11.4 | 34.8 | 15.1 | 15.6 | 86.7 | 5.9 | 26.7 |
| 4 | 11.8 | 32.8 | 13.9 | 13.7 | 87.0 | 4.8 | 23.3 |
| 5 | 12.4 | 20.3 | 8.6 | 8.8 | 92.2 | 2.8 | 15.8 |
| 6 | 12.8 | 21.0 | 8.8 | 8.3 | 93.0 | 2.6 | 15.7 |
| 7 | 12.8 | 24.6 | 9.9 | 10.6 | 92.2 | 3.4 | 19.0 |
| 8 | 12.7 | 20.9 | 8.6 | 9.6 | 93.0 | 3.0 | 16.3 |

[10]BYK Wavescan instrument manufactured by BYK Gardner USA of Columbia, Maryland.

| Vertical Panels - Appearance and Physical Properties | | | | | | | |
|---|---|---|---|---|---|---|---|
| | BYK Wavescan[11] | | | | | | |
| Example | du | Wb | Wc | Wd | DOI | Long Wave | Short Wave |
| 1 | 13.7 | 33.2 | 22.9 | 23.6 | 86.2 | 12.7 | 26.6 |
| 2 | 12.2 | 32.6 | 23.4 | 24.3 | 86.9 | 13.3 | 25.8 |
| 3 | 11.9 | 34.6 | 24.7 | 23.4 | 86.4 | 13.9 | 27.2 |
| 4 | 12.4 | 33.4 | 23.8 | 22.2 | 86.5 | 13.1 | 26.6 |
| 5 | 14.1 | 30.2 | 16.8 | 16.4 | 90.5 | 7.6 | 28.8 |
| 6 | 13.7 | 25.9 | 17.8 | 18.8 | 89.6 | 9.5 | 23.0 |
| 7 | 12.6 | 27.1 | 15.6 | 16.9 | 90.1 | 7.9 | 24.2 |
| 8 | 12.8 | 27.5 | 17.1 | 16.9 | 90.3 | 8.3 | 26.6 |

[11]BYK Wavescan instrument manufactured by BYK Gardner USA of Columbia, Maryland.

Examples 9-12

Four (4) clearcoat compositions were prepared from the following mixture of ingredients. Example 9 illustrates a Control example that does not contain a polysiloxane resin comprising aromatic functional groups and terminal active hydrogen groups. Examples 10-12 are illustrative of the present invention:

| | Parts by weight of Component | | | |
|---|---|---|---|---|
| Components | Example 9 (control) | Example 10 | Example 11 | Example 12 |
| Methyl N-amyl ketone | 74.5 | 74.5 | 74.5 | 74.5 |
| Ethyl 3-ethoxypropanoate | 64.2 | 64.2 | 64.2 | 64.2 |
| SOLVESSO 100[1] | 24.0 | 24.0 | 24.0 | 24.0 |
| SRA-93 | | | | |
| Dipropylene glycol monomethyl ether | 8.0 | 8.0 | 8.0 | 8.0 |
| EVERSORB 76[2] | 12.4 | 12.4 | 12.4 | 12.4 |
| CHISORB 328[3] | 12.4 | 12.4 | 12.4 | 12.4 |
| RESIMENE 757[4] | 369.9 | 369.9 | 369.9 | 369.9 |
| Acrylic polyol[5] | 49.2 | 49.2 | 49.2 | 49.2 |
| Silica dispersion[6] | 216.6 | 216.6 | 216.6 | 216.6 |
| Acrylic polyol[7] | 193.4 | 168.4 | 155.8 | 180.9 |
| Polysiloxane of Example B | — | 16.8 | 25.1 | 8.4 |
| Polyester polyol[8] | 376.9 | 376.9 | 376.9 | 376.9 |
| DISPARLON OX-60[9] | 3.0 | 3.0 | 3.0 | 3.0 |
| EVERSORB 93[10] | 2.5 | 2.5 | 2.5 | 2.5 |
| Siloxane borate[11] | 16.1 | 16.1 | 16.1 | 16.1 |
| Siloxane borate[12] | 3.3 | 3.3 | 3.3 | 3.3 |
| Isobutyl alcohol | 19.2 | 19.2 | 19.2 | 19.2 |

|  | Parts by weight of Component | | | |
|---|---|---|---|---|
| Components | Example 9 (control) | Example 10 | Example 11 | Example 12 |
| Dodecylbenzylsulfonic acid soluton | 30.5 | 30.5 | 30.5 | 30.5 |
| Reduction | | | | |
| Methyl N-amyl ketone | 25.5 | 21.5 | 23.1 | 23.1 |
| TOTAL | 1501.4 | 1489.2 | 1486.6 | 1494.9 |

[1] Blend of aromatic solvents available from ExxonMobil Corporation.
[2] UV absorbers commercially available from Everlight Chemical Taiwan.
[3] Hindered amine light stabilizer, available from Chitec Chemical Corporation
[4] Melamine curing agent commercially available from INEOS Melamines.
[5] Acrylic polyol prepared according to Example A in U.S. patent application Ser. No. 15/296,514
[6] A dispersion of 8% AEROSIL R812 silica (available from Evonik Industries AG) mixed with 42% n- butyl acetate and 50% acrylic polyol. The acrylic polyol is made at 67% solid in the mixture of 40% solvesso-100 and 60% methoxy propyl acetate and is made by copolymerizing 18.5% butyl methacrylate, 40% 2-hydroxy propyl acrylate, 20.5% styrene, 19.0% butyl acrylate, and 2% acrylic acid using 1% di-tertiary amyl peroxide. The polyol has a weight average molecular weight of around 9000.
[7] Acrylic polyol prepared according to Example B in U.S. patent application Ser. No. 15/296,514
[8] Polyester polyol prepared according to Example D in U.S. patent application Ser. No. 15/296,514
[9] Additives available from Kusumoto Chemicals.
[10] Hindered amine light stabilizer available from Everlight Chemical Taiwan.
[11] Siloxane borate prepared according to Example E in U.S. patent application Ser. No. 15/296,514
[12] Siloxane borate prepared according to Example F in U.S. patent application Ser. No. 15/296,514

A solventborne primer commercially available from PPG as FCP6578R was spray applied in an environment controlled to 70-75° F. (21-24° C.) and 50-60% relative humidity onto 4 inch by 12 inch (10 cm by 30 cm) steel panels that were coated with PPG Electrocoat (ED6280Z) commercially available from PPG. The substrate panels were obtained from ACT Test Panels, LLC of Hillsdale, Mich. The primer was applied in one coat, and then flashed at ambient temperature (23° C.) for 6 minutes. The film thickness was approximately 0.83 mils (21 microns). A solventborne basecoat, commercially available from PPG as DCT7325RL was applied in an environment controlled to 70-75° F. (21-24° C.) and 60-70% relative humidity. The basecoat was then applied in two coats, with a 1 minute flash between coats, and then flashed at ambient temperature (23° C.) for 7 minutes. The film thickness was approximately 0.63 mils (15 microns). Each clearcoat was then spray applied over the basecoated panels in two coats with a 1.5 minute flash between coats. The clearcoated panels were allowed to flash for 8 minutes at ambient conditions (23° C.), then baked for 10 minutes at 180° F. (82° C.) followed by a bake for 25 minutes at 285° F. (141° C.). Each film thickness was approximately 2.0 mils (50.8 microns).

Appearance and physical properties were measured on the coated panels. Lower BYK Wavescan values are more desirable for appearance; these properties were improved for virtually all of the examples of the present invention as shown below.

| Horizontal Panels - Appearance and Physical Properties | | | | | | |
|---|---|---|---|---|---|---|
| | BYK Wavescan[10] | | | | | |
| Example | du | Wb | Wc | Wd | Long Wave | Short Wave |
| 9 (Control) | 11 | 22 | 12 | 14 | 5 | 15 |
| 10 | 11 | 23 | 11 | 14 | 5 | 15 |
| 11 | 10 | 21 | 10 | 12 | 4 | 15 |
| 12 | 10 | 20 | 10 | 12 | 4 | 14 |

[10] BYK Wavescan instrument manufactured by BYK Gardner USA of Columbia, Maryland.

| Vertical Panels - Appearance and Physical Properties | | | | | | |
|---|---|---|---|---|---|---|
| | BYK Wavescan[11] | | | | | |
| Example | du | Wb | Wc | Wd | Long Wave | Short Wave |
| 9 (Control) | 13 | 29 | 19 | 18 | 9 | 21 |
| 10 | 12 | 32 | 19 | 17 | 9 | 23 |
| 11 | 11 | 27 | 20 | 16 | 9 | 19 |
| 12 | 12 | 27 | 19 | 16 | 9 | 19 |

[11] BYK Wavescan instrument manufactured by BYK Gardner USA of Columbia, Maryland.

Whereas particular examples of this invention have been described above for purposes of illustration, it will be evident to those skilled in the art that numerous variations of the details of the present invention may be made without departing from the scope of the invention as defined in the appended claims.

What is claimed is:

1. A curable film-forming composition comprising:
   (a) a polymeric binder comprising reactive functional groups;
   (b) a curing agent comprising functional groups that are reactive with the reactive functional groups of (a);
   (c) a polysiloxane resin comprising aromatic functional groups and terminal active hydrogen groups; and
   (d) a rheology modifier comprising a non-aqueous dispersion of an internally crosslinked organic polymer; wherein the polysiloxane resin (c) is present in the curable film-forming composition in an amount of at most 5 percent by weight, based on the total weight of resin solids in the curable film-forming composition.

2. The curable film-forming composition according to claim 1 wherein the polymeric binder (a) comprises an acrylic polyol prepared from a monomer mixture comprising a hydroxyl functional monomer; the curing agent (b) comprises functional groups that are reactive with hydroxyl functional groups; and wherein the rheology modifier further comprises:
   a silica dispersion; and/or
   a reaction product of an amine and an isocyanate.

3. The curable film-forming composition according to claim 1, wherein the polymeric binder (a) comprises an epoxide functional polymer.

4. The curable film-forming composition according to claim 1, wherein the polymeric binder (a) comprises an acrylic polyol and/or a polyester polyol.

5. The curable film-forming composition according to claim 1, wherein the polymeric binder (a) further comprises carbamate groups.

6. The curable film-forming composition according to claim 1, wherein the curing agent (b) comprises an aminoplast, a polyacid, and/or a polyisocyanate.

7. The curable film-forming composition according to claim 1, wherein the terminal active hydrogen groups on the polysiloxane resin (c) comprise hydroxyl and/or carboxylic acid groups.

8. The curable film-forming composition according to claim 1, wherein the polysiloxane resin (c) comprises urethane and/or ether linkages.

9. The curable film-forming composition according to claim 1 wherein the polysiloxane resin (c) is present in the curable film-forming composition in an amount of at least 0.5 percent by weight, based on the total weight of resin solids in the curable film-forming composition.

10. A coated substrate comprising:
A) a substrate; and
B) a film-forming composition applied to a surface of the substrate, forming a coating; wherein the film-forming composition comprises the curable film-forming composition of claim 1.

11. A coated substrate comprising:
A) a substrate; and
B) a film-forming composition applied to a surface of the substrate, forming a coating; wherein the film-forming composition comprises the curable film-forming composition of claim 2.

12. A multi-component composite coating comprising a first film-forming composition applied to a substrate to form a colored base coat, and a second, transparent film-forming composition applied on top of the base coat to form a clear top coat, wherein the transparent film-forming composition comprises the curable film-forming composition of claim 1.

13. The multi-component composite coating according to claim 12 wherein, the multi-component composite coating further comprises a primer composition applied to the substrate prior to application of the first film-forming composition.

14. A method for forming a composite coating on a substrate comprising: (A) applying a first film-forming composition to at least a portion of a surface of the substrate to form a colored base coat; and (B) applying a second, transparent film-forming composition to at least a portion of the base coat formed in step (A) prior to substantially curing the first film-forming composition, to form a clear top coat thereon, wherein the transparent film-forming composition comprises the curable film-forming composition of claim 1.

15. The method according to claim 14, wherein the method further comprises a step of forming a primer coating upon the surface of the substrate prior to applying the first film-forming composition of step (A), wherein the first coating composition is applied directly onto the primer coating.

16. The method according to claim 15, wherein the primer coating is cured prior to applying the first coating composition of step (A).

17. The method according to claim 14, wherein the method further comprises (C) holding the substrate at a temperature and for a time sufficient to substantially cure the composite coating after all coating compositions have been applied to the substrate.

* * * * *